United States Patent [19]

Erickson

[11] 4,379,620
[45] Apr. 12, 1983

[54] LIGHT MODULATOR EMPLOYING ELECTROOPTIC CRYSTALS

[75] Inventor: Kent E. Erickson, Brookside, N.J.

[73] Assignee: Keuffel & Esser Company, Morristown, N.J.

[21] Appl. No.: 132,025

[22] Filed: Mar. 20, 1980

[51] Int. Cl.³ .............................................. G02F 1/03
[52] U.S. Cl. ...................................... 350/387; 350/392
[58] Field of Search ............... 350/387, 389, 392, 406, 350/376, 336; 310/365–366; 339/277 R

[56] References Cited

U.S. PATENT DOCUMENTS

| | | | |
|---|---|---|---|
| 1,796,650 | 3/1931 | Harrison | 310/366 |
| 2,134,775 | 11/1938 | Bergan | 339/277 R |
| 3,098,950 | 7/1963 | Geshner | 174/52 PE |
| 3,304,428 | 2/1967 | Peters | 350/389 |
| 3,659,917 | 5/1972 | Boutineau | 350/392 |

FOREIGN PATENT DOCUMENTS 759014  3/1953  Fed. Rep. of Germany ...... 310/365

OTHER PUBLICATIONS

Coles, H. J. "A Simple Electric Field Birefringence Cell", Polymer, 6–1977, pp. 554–556.

*Primary Examiner*—William H. Punter
*Attorney, Agent, or Firm*—Lionel N. White

[57] ABSTRACT

An electrooptic light modulator is constructed from a pair of subassemblies each comprising a lithium tantalate crystal fixed between two rigid, conductive electrodes. Such subassemblies may be individually tested to ensure the selection of a pair of crystals which are matching in thermal and electrical responses. The modulator construction is completed by arranging the selected subassembly pair with crystal optic axes in orthogonal relationship in order to negate the effects of natural crystal birefringence, and fixing the subassemblies between a pair of rigid pole pieces which, together with the electrodes, serve as heat sinks to moderate the effect of thermal fluctuations, and further stabilize the assembly against mechanical and piezoelectric perturbations.

8 Claims, 5 Drawing Figures

4,379,620

LIGHT MODULATOR EMPLOYING ELECTROOPTIC CRYSTALS

BACKGROUND

The utility of KDP (potassium deuterium phosphate) and lithium tantalate crystals in modulating light beams has long been known. The electrically responsive birefringence of these crystal materials enables a wide range of light beam modulation; however, the temperature-responsive natural birefringence which these crystals also exhibit detracts significantly from the modulated signal stability necessary in many applications.

The lithium tantalate crystal is particularly desirable for use in an electrooptic modulator, since it is substantially non-hygroscopic, has a moderately high electrooptic coefficient, and relatively low degree of birefringence. This latter property, although low, is sufficient to significantly detract from the utility of a modulator unless the affects of temperature variations are controlled. In this respect a useful means of significantly reducing or eliminating the effect of temperature changes on the natural birefringence of the lithium tantalate crystal modulator has been known for some time and entails the arrangement of a pair of such crystals in a light beam in such a manner that their optic axes are effectively orthogonal to one another. The effect of such an arrangement is to cause the temperature-responsive natural birefringence of the assembled lithium tantalate crystal pair to cancel.

This practice of accounting for temperature-responsive variations in the natural birefringence of lithium tantalate crystals is described in an article by M. R. Biazzo, "Fabrication of a Lithium Tantalate Temperature-Stabilized Optical Modulator", *APPLIED OPTICS*, Vol. 10 No. 5, pg. 1016 (1971). While the basic approach described in that article for the construction of a modulator has proven useful to some extent the procedure does not lend itself to the practical manufacture of optical modulators at reasonable cost.

Although the natural, temperature-responsive birefringence of a pair of lithium tantalate crystal elements may be matched to a significant degree by cutting them from a single boule, or mother crystal, such elements, in fact, possess some significant variations in this property which can adversely affect the resulting modulator. Since such variations do not become apparent until final assembly and testing of the modulator described, for example, by Biazzo, substantial and costly manufacturing time is expended in the search for a properly matched pair of crystal elements.

Such limitations to the practical utility of lithium tantalate crystals in the manufacture of light beam modulators are obviated by the present invention in which single-crystal subassemblies are constructed in such a manner as to enable the testing of various combinations of crystals in order to identify perfectly matched pairs prior to any final assembly of a modulator. As a result, costly disassembly, normally required where crystal mismatches are encountered, is avoided. The invention also provides a means of final assembly which eliminates the introduction of physical strains upon the crystal elements which could otherwise result in undesirable variations in the electrical response of such crystals to applied signal voltages.

SUMMARY

In accordance with the present invention the crystal elements, which are cut from a single boule, are identified with respect to the orientation of their optic axes and are each structured into individual identical subassemblies comprising a crystal element fixed in electrical contact between two conductive electrodes. In this subassembly form each of the crystals may be simply combined with a standard crystal in a light beam in order to examine and measure its individual response to applied signal voltages and temperature change.

Subassembly pairs exhibiting sufficiently similar natural birefringent properties are then arranged with their optical axes orthogonal to one another to eliminate the effects of natural birefringence, and are fixed between conductive pole pieces in such a manner that their electrical birefringent responses are cumulative. After a final testing to ensure a proper crystal element balance, the crystal pair assembly is encased in a protective body to complete the modulator unit. In the event that a crystal pair assembly generates a substandard response as a result of a crystal pair mismatch or imposed physical strains, the assembly may be quickly disassembled into its single-crystal subassembly units for reassembly or further matching with a more appropriate crystal subassembly. In this manner little time and few crystal elements are wasted in the mass manufacture of light beam modulators.

DRAWINGS

DESCRIPTION

Figure 1:
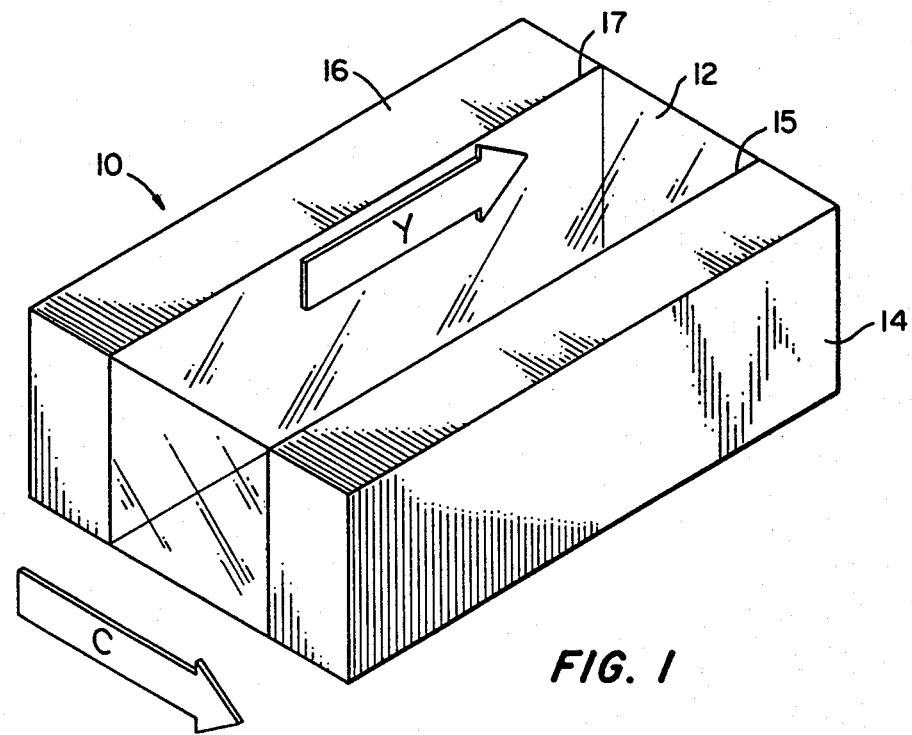
FIG. 1 is an isometric view of a crystal subassembly of the present invention.

The basic crystal subassembly 10 used in the manufacture of the optical modulator of the present invention comprises a lithium tantalate crystal element 12 to which are adhered a pair of electrically conductive electrodes 14, 16. The crystal element is one of many identical segments cut from a single boule to dimensions of approximately 2×2×10 mm. The growth axis, Y, and the optic axis, C, of the original boule are noted with respect to each crystal element in order to ensure the proper orientation of the subassemblies in the final modulator. All faces of the crystal element are polished to ensure rectilinearity and parallelism between opposing faces, the end faces of the crystal element being parallel to within 5 arc seconds with a flatness of $\lambda/10$. These end faces are respectively coated with anti-reflection $\lambda/4$ layers (632.8 nm) of $SiO_2$ and $Y_2O_3$.

To the sides of the crystal element which are perpendicular to its directional C-axis, front 14 and back 16 electrodes of oxygen-free copper are adhered with electrically-conductive epoxy applied to the crystal/electrode interfaces 15, 17. The adhesive joints are cured at room temperature for about 72 hours and excess adhesive cleaned from all exposed faces of the crystal. The resulting single-crystal subassembly is then subjected to a thermal cycling through −40° C. to +135° C. before being allowed to return to room temperature for initial testing. It has been found that this thermal cycling reveals any strain flaws which might otherwise only be exhibited during use of a completed modulator.

Each single-crystal subassembly is initially tested for light transmission in a simple arrangement which projects the beam of a HeNe laser (632.8 nm) through the crystal along the Y-axis to incidence upon a photoelectric device which provides a measure of the output beam intensity. This transmission test effectively reveals physical impurities or improper coatings on the crystal, a ratio of output to input beam intensity in excess of about 85% being taken as indication of good quality single-crystal subassembly.

The existence of internal strains or crystal imperfections which would affect the performance of the subassembly crystal may be determined in an extinction test conducted with a quartz $\lambda/4$ plate and a plane polarized analyzer inserted in series between the crystal and the photocell of the above test arrangement. For this test the input light beam is polarized 45° to the C-axis of the crystal, and the optic axis of the $\lambda/4$ plate set parallel to the plane of beam polarization. The analyzer is then rotated to obtain the maximum, $T_{max}$, and minimum, $T_{min}$, transmitted light intensities. A ratio, $T_{min}/T_{max}$, of less than about 5% indicates a good quality single-crystal subassembly.

An electrooptic sensitivity test is then made with the subassembly in the extinction test arrangement. A 115 V, 60 Hz signal is applied across the crystal subassembly and the analyzer rotated until photocell output registers a uniform 60 Hz signal. The peak-to-peak amplitude of this signal should be greater than about 60% of the extinction test $T_{max}$ value.

Figure 2:
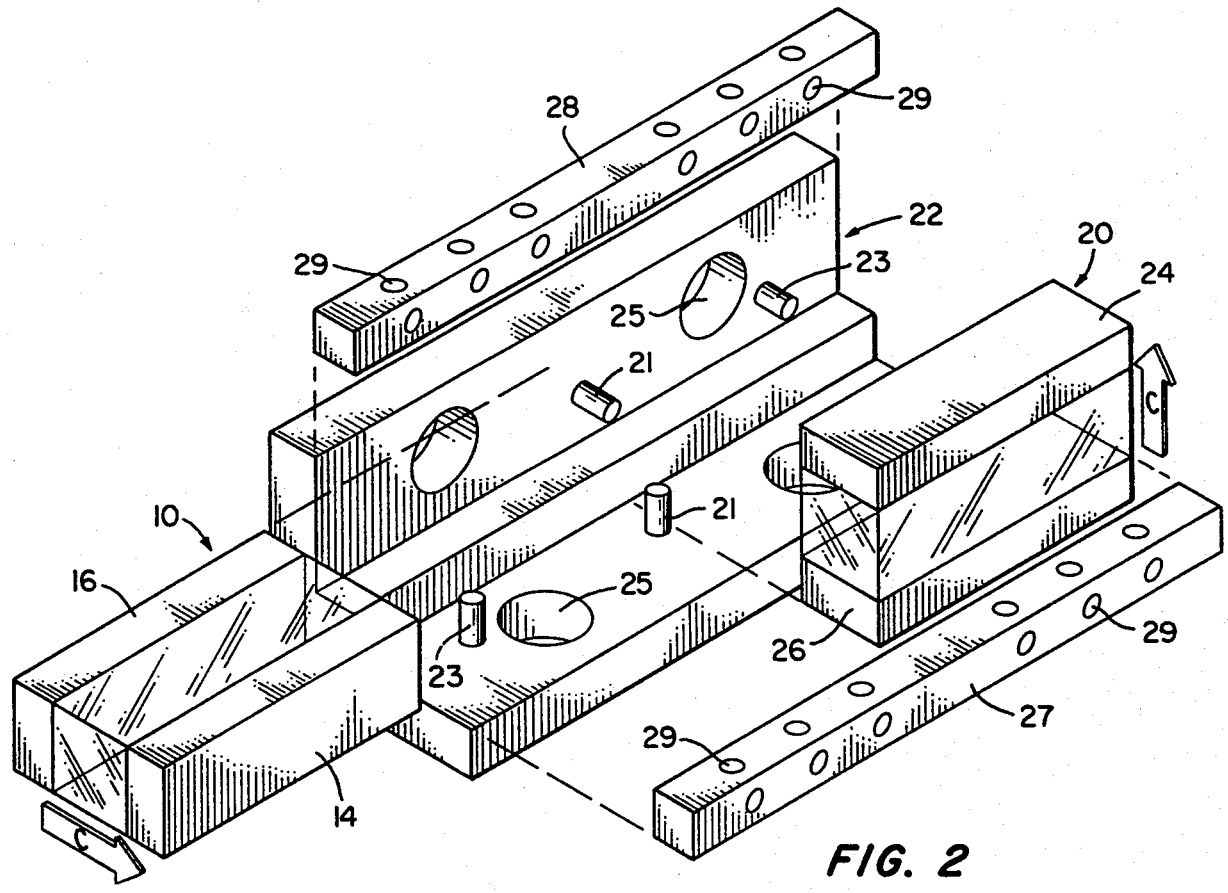
FIG. 2 is an exploded isometric view showing the manner of assembly of a pair of crystal subassemblies and conductive pole pieces with the aid of an assembly jig fixture.

Pairs of satisfactory single-crystal subassemblies, preferably comprising crystal elements originating at closely neighboring locations within the same boule, are combined to form the two-crystal modulator assembly in the manner depicted in FIG. 2. To simplify the assembly operation and ensure proper and consistent structural conformation, a jig fixture 22, preferably of heat-conductive and solder abherent material such as aluminum, is utilized. Single-crystal subassemblies 10, 20 are arranged in contact with the respective faces of fixture 22 in the spacial relationship shown. The proper attitude of subassemblies 10, 20 is ensured by the presence of peg elements 23 which limit their positioning to one in which the crystals are in line and their C-axes are orthogonal. Peg elements 21 establish a separation of about 1.25 mm between the SiO$_2$-coated end faces of the respective crystals. By thus preventing contiguity between the crystals, this structure isolates and reduces the effects of any thermal expansion differentials.

Specific attention is given to orienting the subassembly units in the manner shown; that is, with their respective C-axes arranged orthogonally and each pointing in like direction with respect to contiguous faces of fixture 22. Thus, front electrodes 14, 24 associated with the positive direction of the C-axes will be in electrical contact with different ones of the input signal terminals of the completed modulator in order to ensure a cumulative response to applied signal.

Continuing with the assembly as shown in FIG. 2, pole pieces 27, 28 are added to the properly oriented single-crystal subassemblies 10, 20 and made to contact along the accessible faces of front/back electrode pairs 14, 26 and 24, 16 respectively. Each of the pole pieces 27, 28 are of oxygen-free copper and comprise a plurality of bores 29 which have previously been filled with a solder having a relatively low melting point of about 104° C.

With the elements of the assembly in position on fixture 22, a second and substantially identical fixture piece (not shown) lacking only pegs 21, 23 is positioned to enclose and immobilize those assembly elements. Resilient clamping means (not shown) retains the assembly firmly within the confines of the jig fixtures without imposing strains upon the individual crystals.

The jig fixture assembly is then inserted into an oven at about 130° C. for about 15 minutes to ensure thorough heating. Soldering flux is then introduced through each of the ports 25 in the fixture pieces and the assembly allowed to remain in the oven for an additional 10 minutes. The oven is then turned off and the assembly allowed to cool to about 60° C. before being removed. In this manner the solder is allowed to set slowly without imposing any strains on the crystals. This oven soldering process further ensures that a plurality of crystal pair assemblies may be manufactured under identical conditions in order that the properties of previous crystal matching are not lost.

After the soldered assembly has returned to room temperature, the jig fixture pieces are removed and the two-crystal assembly is cleaned ultrasonically in a bath of acetone. The unit is then tested, as noted above, for transmission, extinction, and electrooptic sensitivity. It has been found that good assembly units will exhibit a transmission of greater than about 75% with a $T_{min}/T_{max}$ extinction test ratio of less than about 7%. The electrooptic sensitivity test peak-to-peak amplitude is preferably greater than about 90%.

In addition to the foregoing tests which are conducted at room temperature, a thermal tracking test is made on each two-crystal assembly by heating the assembly to a stable 50° C. and orienting the analyzer to produce a uniform second harmonic (120 Hz) signal. The assembly is then brought to thermal equilibrium at 0° C. and the analyzer again positioned to yield the uniform 120 Hz output. The difference in angular orientation of the analyzer at these two output conditions should be less than about 7.5°. At the completion of all the noted testing any sub-standard unit may simply be reheated in the oven for disassembly and the single-crystal subassemblies retested for more appropriate matching.

Figure 3:
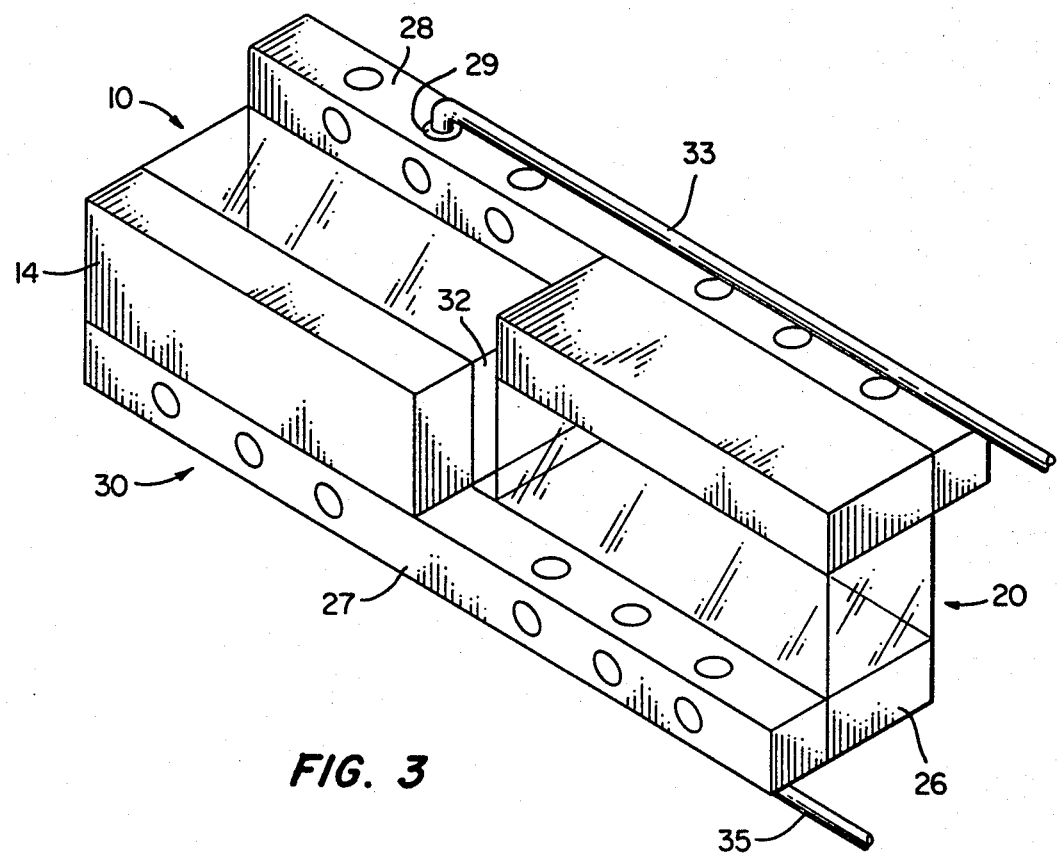
FIG. 3 is an isometric view of a completed two-crystal assembly including a pair of electrical conductors.

An acceptable two-crystal structure is completed as shown in FIG. 3 by addition of a pair of 28 gauge copper wire conductors 33, 35 which are heated and inserted into one of the solder-filled bores 29 in each of the assembly pole piece bars 27, 28. The completed two-crystal unit is then prepared for incorporation into the finished modulator body by the application of a thick, protective layer of moldable mastic material, such as a silicone rubber putty, to completely enclose the 1.25 mm gap 32 between the inner crystal end faces in order to prevent the intrusion into the gap of later-applied potting compound material.

Figure 4:
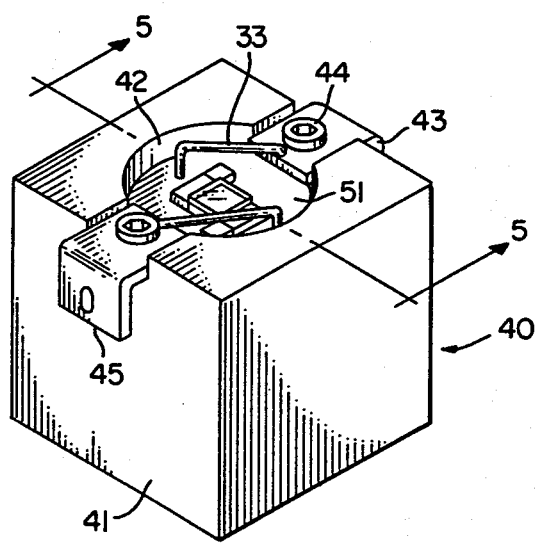
FIG. 4 is an isometric view of the crystal assembly of FIG. 3 embedded in a body to form a final modulator structure.
Figure 5:
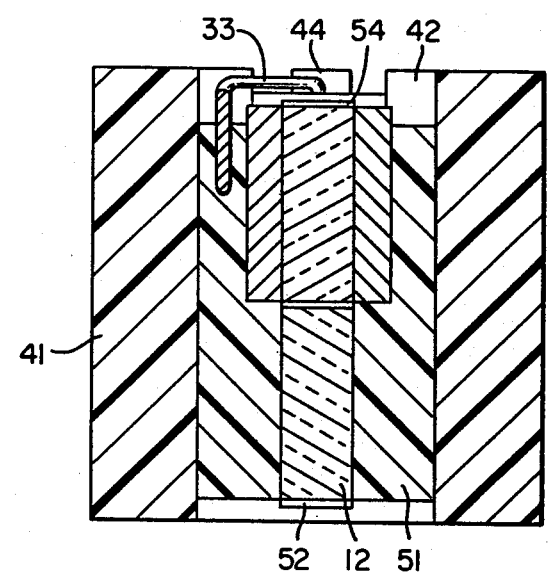
FIG. 5 is a cross-sectional view, taken at 5—5 in FIG. 4, of the modulator structure of the present invention.

The final modulator structure 40 is shown in FIGS. 4 and 5 and comprises a body 41 of rigid, nonconductive plastic material having a bore 42 through its center. The two-crystal unit is disposed longitudinally within the bore with the aid of a closely-fitting lower bore end cap (not shown) and the annular space between the unit and the bore wall filled with a common electronics potting compound 51, thereby protectively encasing the unit in that insulating material. Care is taken after this potting operation to remove any of the compound which might have been deposited on the exposed $Y_2O_3$-coated end faces of the lithium tantalate crystals. The extending wire conductors 33, 35 are then soldered to respective terminal pieces 43, 45 which are affixed to body 41 by means such as screws 44.

The modulator is then completed by affixing to the exposed crystal end faces with optical cement quartz $\lambda/4$ plate pieces 52, 54 disposed so that their respective optic axes are at 45° to the C-axes of the crystals and orthogonal to each other. After a final series of transmission, extinction, electrooptic, and thermal tests, the results of which should be substantially as good as exhibited by the two-crystal assembly alone, except for an increase in transmissivity to greater than about 90%, the completed modulator is ready for incorporation into any of various light beam modulation instruments.

In addition to the noted ease and uniformity with which the electrooptic modulators of the present invention may be mass produced, they consistently exhibit properties which are exceptionally desirable in this type of device; namely, positive response at low input voltage, low loss tangent of about 0.007, low capacitance ranging about 10 pF, and low piezoelectric resonance, while providing better than about 90% modulation up to at least 50 MHz.

What is claimed is:

1. An electrooptic modulator comprising an assembly comprising:
    (a) a pair of electrooptic crystal subassemblies, each of which comprises:
        (i) an elongate, rectilinear, transparent crystal element consisting essentially of a compound exhibiting electrooptic birefringence, said crystal element having a transverse directional optic axis disposed perpendicular to two parallel opposing longitudinal faces of said crystal element and,
        (ii) a pair of rigid, elongate, electrically-conductive electrodes, each of which is affixed to and contiguous with a respective one of said opposing faces, thereby establishing, with respect to said directional optic axis, a front and a back electrode for said subassembly;
    (b) said subassembly pair being arranged end-to-end with the longitudinal axes of said crystal elements in line and the respective optic axes of said crystal elements disposed orthogonal to one another and to the longitudinal axis of said end-to-end arrangement; and
    (c) a pair of rigid, electrically-conductive pole pieces respectively affixed to and bridging the front electrode of the first and the back electrode of the second of said subassembly pair, and the front electrode of the second and the back electrode of the first of said subassembly pair.

2. An electrooptic modulator according to claim 1 wherein the proximal crystal end faces of said end-to-end subassembly arrangement are separated by an air gap.

3. An electrooptic modulator according to claim 1 wherein said assembly further comprises a pair of optical $\lambda/4$ plates each of which is affixed to a different one of the distal crystal end faces of said end-to-end subassembly arrangement.

4. An electrooptic modulator according to claim 3 wherein said assembly further comprises a pair of electrical conductors each of which is in electrical connection with a different one of said pair of pole pieces.

5. An electrooptic modulator according to claim 4 which further comprises a body of electrically insulating material encasing substantially the whole of said assembly but for at least a portion of each of said conductors and at least the central areas of each of said $\lambda/4$ plates.

6. The method of making an electrooptic modulator which comprises:
    (a) providing a pair of elongate, rectilinear, transparent crystal elements consisting essentially of a compound exhibiting electrooptic birefringence, each of said crystal elements having a transverse directional optic axis disposed perpendicular to two parallel opposing longitudinal faces thereof;
    (b) affixing contiguously to each of said longitudinal crystal element faces a rigid, elongate, electrically-conductive electrode, thereby constructing a pair of crystal subassembly units, each having, with respect to its individual directional optic axis, a front and a back electrode;
    (c) arranging said pair of subassembly units in an end-to-end relationship with the longitudinal axes of said crystal elements in line and the respective optic axes of said crystal elements orthogonal to one another and to the longitudinal axis of said end-to-end arrangement;
    (d) affixing a first rigid, electrically-conductive pole piece between the front electrode of the first and the back electrode of the second of said subassembly pair; and
    (e) affixing a second rigid, electrically-conductive pole piece between the back electrode of the first and the front electrode of the second of said subassembly pair;
thereby forming a rigid, two-crystal electrooptic modulator assembly.

7. The method according to claim 6 which further comprises:
    (a) affixing to each of said pole pieces a different respective one of a pair of electrical conductors; and
    (b) affixing to each of the distal crystal end faces of said assembly a different respective one of a pair of optical $\lambda/4$ plates, said plates being oriented such that their individual optic axes are orthogonal to one another and at 45° to the crystal optic axes.

8. The method according to claim 7 which further comprises encasing in a body of electrically insulating material substantially the whole of the resulting assembly but for at least a portion of each of said conductors and at least the central area of each of said $\lambda/4$ plates.

* * * * *